United States Patent
Lipton et al.

(10) Patent No.: US 8,482,654 B2
(45) Date of Patent: Jul. 9, 2013

(54) STEREOSCOPIC IMAGE FORMAT WITH DEPTH INFORMATION

(75) Inventors: Lenny Lipton, Los Angeles, CA (US); Michael G. Robinson, Boulder, CO (US); Robert Akka, Sausalita, CA (US)

(73) Assignee: RealD Inc., Beverly Hills, CA (US)

( * ) Notice: Subject to any disclaimer, the term of this patent is extended or adjusted under 35 U.S.C. 154(b) by 495 days.

(21) Appl. No.: 12/606,121

(22) Filed: Oct. 26, 2009

(65) Prior Publication Data

US 2010/0103249 A1 Apr. 29, 2010

Related U.S. Application Data

(60) Provisional application No. 61/108,395, filed on Oct. 24, 2008.

(51) Int. Cl.
*H04N 5/225* (2006.01)

(52) U.S. Cl.
USPC ............... 348/340; 348/42; 348/51; 382/154; 359/618

(58) Field of Classification Search
USPC ...... 348/340, 51, E13.075, E13.007; 382/154
See application file for complete search history.

(56) References Cited

U.S. PATENT DOCUMENTS

| 5,193,000 | A | 3/1993 | Lipton |
| 6,349,001 | B1* | 2/2002 | Spitzer .......................... 359/618 |
| 2005/0129305 | A1 | 6/2005 | Chen et al. |
| 2007/0285554 | A1* | 12/2007 | Givon ........................... 348/340 |
| 2007/0286476 | A1* | 12/2007 | Kim et al. ..................... 382/154 |
| 2010/0165077 | A1* | 7/2010 | Yin et al. ....................... 348/42 |

OTHER PUBLICATIONS

PCT/US0962126, International Search Report and the Written Opinion of the International Searching Authority, dated Dec. 7, 2009.
Written opinion of the International Preliminary Examining Authority in PCT/US09/62126.
Lipton, L., "Foundations of the Stereoscopic Cinema", Van Nostrand Reinhold (1982) [Submitted electronically in two parts].

* cited by examiner

*Primary Examiner* — Kyung H Shin
(74) *Attorney, Agent, or Firm* — Baker & McKenzie LLP

(57) ABSTRACT

A multi-view distribution format is described for stereoscopic and autostereoscopic 3D displays. In general, it comprises multi-tile image compression with the inclusion of one or more depth maps. More specifically, it provides embodiments that utilize stereoscopic images with one or more depth maps typically in the form of a compressed grey scale image and, in some instances, incorporates depth information from a second view encoded differentially.

22 Claims, 11 Drawing Sheets

1300

1400

| | | | a | b | c | d | | | | h | i | j |
|---|---|---|---|---|---|---|---|---|---|---|---|---|
| 1601 | L | LEFT EYE VIEW | a | b | c | d | | | | h | i | j |
| 1602 | R | RIGHT EYE VIEW | a | b | | | | f | g | h | i | j |
| 1603 | DL | DISP MAP FROM L | 0 | 0 | 0 | 0 | -2 | -2 | -2 | 0 | 0 | 0 |
| 1604 | | RIGHT VIEW BASED ON L, DL | a | b | | | | ??? | ??? | h | i | j |
| 1605 | | MIDDLE VIEW BASED ON L, DL | a | b | c | | | | ??? | h | i | j |
| 1606 | DR | DISP MAP FROM R | 0 | 0 | -2 | -2 | -2 | 0 | 0 | 0 | 0 | 0 |
| 1607 | | MIDDLE VIEW BASED ON R, DR | a | b | ??? | | | | g | h | i | j |
| 1608 | | MID VIEW BASED ON L, R, DL, DR | a | b | c | | | | g | h | i | j |
| 1609 | | ESTIMATED DISP MAP FROM R | 0 | 0 | -2 | -2 | -2 | -1.3 | -0.7 | 0 | 0 | 0 |
| 1610 | | DIFFERENTIAL DISP MAP FROM R | 0 | 0 | 0 | 0 | 0 | 1.3 | 0.7 | 0 | 0 | 0 |

| | | | | | | | | | | | |
|---|---|---|---|---|---|---|---|---|---|---|---|
| 1801 | L | LEFT EYE VIEW | | a | b | c | V | W | X | g | h | i |
| 1802 | R | RIGHT EYE VIEW | | a | b | c | T | U | V | g | h | i |
| 1803 | DL | DISP MAP FROM L | | 0 | 0 | 0 | 2 | 2 | 2 | 0 | 0 | 0 |
| 1804 | | RIGHT VIEW BASED ON L, DL | | a | b | c | ??? | ??? | V | g | h | i |
| 1805 | | MIDDLE VIEW BASED ON L, DL | | a | b | c | ??? | V | W | g | h | i |
| 1806 | DR | DISP MAP FROM R | | 0 | 0 | 0 | 2 | 2 | 2 | 0 | 0 | 0 |
| 1807 | | MIDDLE VIEW BASED ON R, DR | | a | b | c | U | V | ??? | g | h | i |
| 1808 | | MID VIEW BASED ON L, R, DL, DR | | a | b | c | U | V | W | g | h | i |

STEREOSCOPIC IMAGE FORMAT WITH DEPTH INFORMATION

CROSS-REFERENCE TO RELATED APPLICATIONS

This application relates and claims priority to commonly-assigned U.S. Provisional Patent Application No. 61/108,395, filed Oct. 24, 2008, and entitled "Multi-tile stereoscopic plus depth distribution format," which is incorporated herein by reference for all purposes. Pursuant to 37 CFR 1.7(b), this application is hereby filed on Monday, Oct. 26, 2009, which is the next succeeding business day following the one year anniversary of the filing of Prov. Pat. App. No. 61/108,395.

BACKGROUND

1. Technical Field

This disclosure relates generally to stereoscopic depth imaging and, more specifically, to a multi-view distribution format for stereoscopic three-dimensional (3D) displays.

2. Background

In stereoscopic imaging, two images (e.g., a left and right image pair) are typically used to create an illusion of depth, or an illusion of a three-dimensional (3D) image. Multi-tile formats, such as the side-by-format or the above-and-below format, provide a simple and effective way to incorporate stereoscopic information into the existing planar or two-dimensional (2D) video transmission protocol. The simplicity of the concept arises from the fact that two images can be placed into the existing frame, or field, to distribute the left and right perspective information between two perspective views.

In stereo systems, typically two images are used to create one 3D view of an image or a scene. In autostereo systems, however, it is desirable to achieve multiple 3D views (i.e. view from different viewer perspectives) and achieving multiple 3D views in autostereo systems is difficult using only a left and right image pair. Furthermore, achieving one good 3D view in a stereo system is difficult may be difficult using only a left and right image pair. Achieving a sensation of depth depends on the parameters and size of a display and an image pair designed for 20" displays may not provide a good 3D image in a 60" display.

BRIEF SUMMARY

Methods and apparatuses disclosed in the present application generally include providing image data including at least two image views and at least one image depth map; and using image data including at least two image views and at least one image depth map, using algorithms. The methods and apparatuses are aimed at providing and using such image data to allow for better 3D stereoscopic images on a variety of displays and to achieve 3D autostereo images on a variety of displays.

According to an aspect, a method is provided for providing and/or transmitting image data including at least two image views and at least one image depth map. According to another aspect, the method may include encoding the image data.

According to another aspect, a method is provided for providing and/or transmitting image data including at least two image views and at least two depth maps. According to another aspect, a method is provided for handling image data including at least two image views at least one image disparity map. According to another aspect, the method may further include receiving the at least two image views and the at least one image disparity map. According to another aspect, the method may further include decoding the at least two image views and the at least one image disparity map.

According to another aspect, a method is provided for decoding image data including at least two image views and at least one image depth map to determine the pixel value and depth value for substantially all pixels in at least one view or perspective of an image.

According to another aspect, a method is provided for decoding image data including at least two image views and at least two image depth maps to determine the pixel value and depth value for substantially all pixels in at least one view/perspective of an image.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
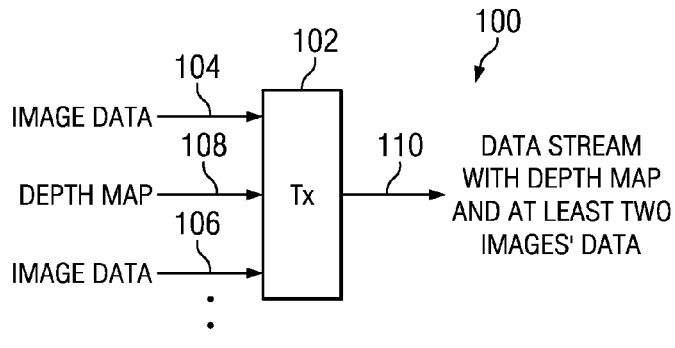
FIG. 1 is a schematic block diagram illustrating an embodiment of a data transmission module, in accordance with the present disclosure.

An exemplary stereoscopic format supplies a side by side compressed right- and left-eye stereoscopic image pair, and a single disparity map which constitutes a set of values (one for each image pixel location) representing pixel translations between views. Differences between the right- and left-eye images are called the disparity between the images. Disparity values relate directly to perceived depth on a stereoscopic display, hence the interchange between the terms depth map and disparity map in the literature and in this disclosure. Most commonly, a disparity map is related to a 2D image where it represents the movement of the pixels of one image in order to generate a second. In the disclosed form, a disparity map can also relate to viewing positions other than the left- and right-eye positions and, thus, may provide mapping information from both provided stereo images to a view associated with the disparity map. I.e., the disclosed disparity maps may provide information for a plurality of views of a stereoscopic image.

In specific embodiments discussed below, it is assumed that the left- and right-eye images are expanded to two full-resolution images in accordance with the original means of compression. Also, disparity values used in the specific embodiments below are integers for clarity. In real implementations, disparity values (like depth information) may be non-integers implemented by rounding, pixel averaging, or using other techniques.

Format

This discussion concentrates on two-tile format and, specifically, on the side-by-side format that has widespread interest in the world of stereoscopic video. However, it is appreciated that the methods, algorithms, and machines disclosed herein are applicable to a variety of formats including, but not limited to, multi-tile formats, two-tile formats, interlace formats, field-sequential formats, etc. Neither the type of data to be transmitted nor the method of using the data is limited with any specific format. In an embodiment, the depth information is treated like the enhancement layer according to the schema proposed by U.S. Prov. Pat. No. 61/168,925 filed Apr. 13, 2009 and entitled, "Method and system for delivering stereoscopic images," which is herein incorporated by reference.

The two-tile format, as described in U.S. Pat. No. 5,193,000 to Lenny Lipton, which is hereby incorporated by reference, describes digital compression and decompression of side-by-side images using digital techniques. Once the images are compressed, they can be restored and presented in any one of a number of different ways compatible with various selection devices and monitor display types. For example, selection devices may include active or passive eyewear, and monitor types may include any of the extant displays incorporated in monitors and television sets, such as liquid crystal displays, plasma display panels, DLP rear projection televisions, optical light-emitting diode displays, or other devices such as field emission devices. Selection technology may include any apparatus for viewing plano-stereoscopic images such as active or passive eyewear. Specific monitor technology may include spatial or temporal multiplexing.

One advantage of side-by-side (and similar multi-tile) formats is that it can survive MPEG or JPEG compression, which is used for the distribution and transmission of planar images. The methodology of JPEG and MPEG is such that the left and right halves of the side-by-side format will be treated equally in terms of compression and decompression. Therefore the two images, when expanded to produce full-field stereoscopic images, are symmetrical. The principle of binocular symmetries is one that is adhered to in stereoscopic transmission systems as described in Lipton's *Foundations of the Stereoscopic Cinema* (Van Nostrand Reinhold, 1982), which is herein incorporated by reference. A place where MPEG compression, or JPEG compression, may have a deleterious effect is at the boundary line between the left and right subfields or side fields; however, that is of minimal account since few pixels are affected.

Given the sophistication of today's electronics, as mentioned above, it is relatively simple to take the side-by-side format (and this works equally well for other formats such as the above-and-below format), and reconstruct it in any one of various stereoscopic formats used for image selection. It could be, for example, an interlace format, which would be useful for micropolarizer technology; it could be field-sequential, which would be useful, for example, for plasma display panel field-sequential devices; or it could be used in the so-called checkerboard format that is useful for DLP rear projection sets—which is an example of both spatial and temporal display technology.

Thus, it is possible to incorporate a chip set, or even a single chip, or a board, within a television set or monitor that can process the incoming side-by-side format and produce a display format that is compatible with passive or active selection devices using various stereoscopic multiplexing schemes.

Compatibility

A backwardly-compatible system is a system allowing input generated for older devices, or systems that can receive, read, or play older standards of formats. Modern display devices do not always use a backwardly-compatible system. To explain further, when NTSC color television was introduced in the early 1950s, the TV designers addressed backward- or downward-compatibility issues because of the prevalence of black-and-white sets and the shortage of distribution means. Television at that time only had 13 channels and only terrestrial transmission was available.

With the rise and expansion of digital media, there are now many channels—literally hundreds of channels available over the air and from cable. There is also Internet protocol television (IPTV) available, for example from Netflix and other vendors like Apple, and, in addition, every DVD or Blu-ray disc has two sides—one that can be potentially devoted to stereoscopic images and the other to conventional planar images. In other words, when a user selects an image from video-on-demand or IPTV, the user can select a stereoscopic version of the program. Thus, the design standards for backward or downward compatibility are relaxed. In fact, backward or downward compatibility may not be used at all in some systems because of the proliferation of multiple channels and content sources. The side-by-side format is a good fit into such a scheme because it provides, based on tests and experiments, very high quality stereoscopic imaging, but it is not backwardly compatible.

Multi-Tile Formats

Using proper sampling techniques, the side-by-side format can be multiplexed and demultiplexed to produce an excellent result. The side-by-side format (and similar formats) is contemplated here, as are plano-stereoscopic displays that have two views that are used in conjunction with individual selection devices (e.g., eyewear). Such systems, with only two views, are difficult to use in autostereoscopic displays, because two views may provide too restrictive a head box (or optimal viewing zone), and would be of limited use on the office desktop and in the home. A multiplicity of views of the same 3D image are preferred for autostereoscopic displays.

For the foreseeable future, the side-by-side or similar multi-tile formats (even those with more than two views) can provide an excellent result for television. But because it has no upward- or forward-compatibility modality, the applications are limited. This disclosure provides an upward-compatibility modality for the side-by-side and similar formats so that in the short-run, the side-by-side or similar tiled formats can provide a useful means for piano-stereoscopic displays with individual selection devices; while in the long-run, the side-by-side or similar formats will provide a path for upward mobility and use with autostereo systems.

Adding Depth

Adding depth information to a signal containing image data allows for generation of multiple 3D image views (for autostereo applications and for some stereo applications) and also allows for post-transmission adjustment of data to fit a certain display in a stereo system.

The depth information added to the signal may include, but is not limited to, depth map information such as that used by Dynamic Digital Depth (DDD) and Philips Electronics in a downwardly compatible approach wherein depth information is added to a planar image (or a single perspective view). DDD and Philips Electronics use this approach because, as already mentioned, it is downwardly compatible and also because it can be used to reconstruct a stereo or autostereo image at the receiver, tailored to the requirements of that receiver and TV set and its selection technology. However, their approach is to use a planar image—that is, a single perspective view—and to add depth information to it by means of a depth map. A virtue of such a system is that it is upwardly compatible as well as backwardly compatible because of its inherent flexibility. However, as discussed above, in today's universe of television distribution and other displays, backward compatibility may be of little or no value. It is upward compatibility that may hold the key to widespread acceptance of a stereoscopic or autostereoscopic service.

One problem with sending a depth map and a planar image is that depth maps lack information. Hidden or occluded material as well as transparent images are difficult to reconstruct. The reconstruction of this material can be aided by providing a stereo pair or, indeed, as is contemplated in this disclosure, by having a multiple-tile source.

The case of the side-by-side format plus depth map will be used, as noted above, in order to make the discussion as simple as possible. It is possible to encode a depth map on top of or in addition to the side-by-side signal, to minimize interference with the side-by-side signal or with the reconstruction of the side-by-side signal in the TV set. The depth map does not have to be completely transparent because a certain percentage of the field can be devoted to the depth map. After all, the side-by-side image may be reconstructed in a TV set (of a set-top box, etc.) that does not require downward compatibility. Accordingly, the efforts that have been put into making depth map information transparent, such as an effort championed by Philips for the MPEG protocol, may be of limited use with regard to the proposed format, but can be used as an option.

The side-by-side information coupled with depth map information provides an increased opportunity for the reconstruction of the stereoscopic or autostereoscopic image compared with a planar image plus depth map alone by providing additional perspective information not available in the depth map. The embodiments disclosed herein increase the opportunity to have sharp, more accurately reconstructed autostereoscopic or stereoscopic images since the information contained in this hybrid format can help create cleaner and better images in terms of many image attributes, including the addition of occlusion information and transparency information. Thus the combination of the stereo pairs in the side-by-side format, for example, plus the depth map information, allows for the simple reconstruction of plano-stereo images and the enhanced reconstruction of autostereo. In principle, pixel disparity may be obtained from the individual images through pixel correlation techniques. The complexity and accuracy of these techniques make them less suitable for decoding, especially in real time in set-top boxes with limited processor power. By sending accurate depth information together with individual images in accordance with this approach overcomes this blocking issue.

Transmit and Encode

FIG. 1 is a schematic diagram 100 illustrating an embodiment of a data transmission module 102. In one embodiment, the data transmission module comprises a controller operable to use at least two image data sets 104, 106 and at least one depth information data sets 108 and transmit a data stream 110 with depth and image data. The controller of the data transmission module 102 may be any suitable device known in the art, and may be embodied in hardware, software, or a combination. The data transmission module 102 may also be stored on computer readable medium, as instructions on a machine.

In an embodiment, the data transmission module 102 includes an encoder module (not shown). The encoder module may use the two or more image data sets and one or more depth map sets to encode and then compress or multiplex the data stream before it is transmitted at 110. Encoding is discussed further at least in relation to FIG. 19 below.

Depending on the desired performance of the data transmission module 102, the module 102 may further comprise a store for temporary storage of scene, image, or depth information 104, 106, 108.

In an embodiment, the data transmission module 102 receives left and right image data at 104 and 106 and receives one set of depth information for the image at 108 and transmits a data stream including left and right image data and one set of depth information.

In another embodiment, the data transmission module 102 receives left and right image data at 104 and 106 and receives multiple sets of depth information for the image at 108 (and so on) and transmits a data stream 110 including left and right image data and multiple sets of depth information.

In still another embodiment, the data transmission module 102 receives multiple image data at 104, 106 (and so on) and receives multiple sets of depth information for the image at 108 (and so on) and transmits a data stream including multiple sets of image data and multiple sets of depth information.

Creation of the encoded data, i.e. the individual images and depth information, can be through computer graphical methods, which may directly yield the information, or using live capture techniques. Stereo cameras can provide left and right eye images and correlation methods may be used to extract depth. This is feasible using one of many algorithms. An alternative is to use a depth camera as part of the capture rig. The remaining embodiments of this disclosure assume offline encoding and transmission of this information, and concentrate on methods of recreating views from the data set.

Receive and Decode

Figure 2:
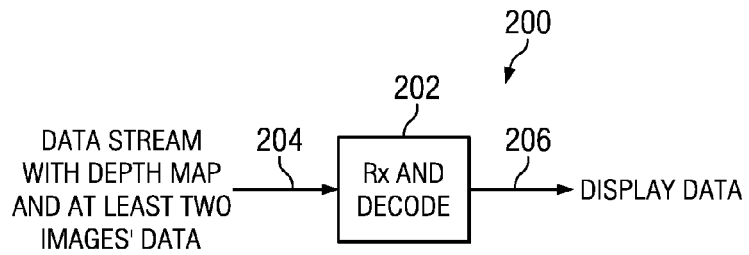
FIG. 2 is a schematic block diagram illustrating an embodiment of a data receiver and decoder module, in accordance with the present disclosure.

FIG. 2 is a schematic diagram 200 illustrating an embodiment of a data receiving and decoding module 202. In one embodiment, the data receiving and decoding module 202 comprises a controller operable to receive and decode a data stream with depth map and at least two images' information 204 and output display data 206. In an embodiment, the receiving and decoding module 202 outputs display data 206 containing a plurality of views of a 3D image. In this embodiment, the output display data 206 is sufficient to use in autostereo display applications. In another embodiment, the receiving and decoding module 202 outputs display data 206 sufficient for a 20" stereoscopic display. In another embodiment, the receiving and decoding module 202 outputs display data 206 sufficient for a 60" stereoscopic display. Thus the receiving and decoding module 202 is capable of taking the data stream 204 and outputting display data 206 for use in a plurality of autostereo or stereo displays. The controller of the data receiving and decoding module 202 may be any suitable device known in the art, and may be embodied in hardware, software, or a combination. The data receiving and decoding module 202 may also be stored on computer readable medium, as instructions on a machine. The data receiving and decoding module 202 may also be stored as instructions on a chip which may be a part of a television, DVD or Blu-ray player, cable box, projector, internet-enabled set-top box, gaming console, or any other device used with visual or display technology.

Depending on the desired performance of the data receiving and decoding module 202, the module 202 may further comprise a store for temporary storage of scene, image, or depth information 204 or may comprise a store for display data for temporary storage of display data 206.

In an embodiment, the data receiving and decoding module 202 receives left and right image data and one set of depth information for the image in data stream 204 and outputs display data 206 using that information.

In another embodiment, the data receiving and decoding module 202 receives left and right image data and multiple sets of depth information for the image in data stream 204 and outputs display data 206 using that information.

In still another embodiment, the data receiving and decoding module 202 receives multiple image data and multiple sets of depth information for the image in data stream 204 and outputs display data 206 using that information.

In an embodiment, the methods and apparatuses disclosed in the present application use algorithms making use of as much image information as possible as well as retaining the fidelity of the raw data whenever possible. For example, if the right/left eye view is used, the algorithm may deliver the high fidelity transported right/left eye image. The depth map information may then add to the information from both left and right eye images to provide images associated with intermediate view positions. In an embodiment, the data receiving and decoding module 202 includes a decoder module (not shown). The decoder module may use the two or more image data sets and one or more depth map sets to decode and then decompress or demultiplex the data stream before it is output at 206. Decoding is discussed further in relation to FIGS. 3-8, 15-18, and 20 below.

In an embodiment, a central depth map is used, as the central depth map may substantially maintain left/right eye symmetry and provide additional depth information from regions occluded in either left or right eye images. Generating a central image with this information is then a first step.

In an embodiment, a disparity map provides a mapping between the left eye image pixel values and each central image pixel. From symmetry, the same data provides mapping information from the right eye image. Recreation of the central image may be carried out by scanning through the pixels of the depth map and mapping appropriately the data from both left and right eye images. In an embodiment, an average of the two sets of data from each of the provided images is used during reconstruction. However, reconstruction can result in repeated, 'double edged' artifacts as some mappings apply to obscured pixel data. Thus, in an embodiment, disclosed algorithms recognize this and discard repeated information or obscured data from a first image in favor of useful data provided by the second image. Occluded data from one view is thus filled by the other's non-occluded information.

In an embodiment, information is occluded in both views. Such a case would exist for a long tube extending centrally from the viewer. From both right and left eye viewpoints it is difficult to tell what is at the end of the tube. In an embodiment, algorithms are used to recreate (or paint the unknown pixels of) a central view in this case. In an embodiment, since the disparity or depth information of the unknown data seen through the tube is known, it is possible to make a more reasonable estimation at the hidden texture. Close regions in the scene with similar disparity or depth are likely to have the same texture and an algorithm may be used to sort through the image data for close regions in the scene with a similar disparity or depth. In the case of the tube, this can still lead to somewhat erroneous data, but in the case of more natural scenes can be very effective.

In an embodiment, for alternative views the disparity mapping is determined for that view and an algorithm is completed similarly to the algorithm for the central view, but with weighted averaging. The weighting should substantially ensure that data is not taken from the wrong image when a pure extreme left or right eye image is generated. In an embodiment, to determine disparity, it is possible to translate the central disparity map in accordance with its internal mapping data. Revealed regions can be filled simply by extending the disparity of the adjacent regions that are 'deeper'. In another embodiment, more sophisticated algorithms may be used to fill the disparity information using texture continuation within the transported images. This could substantially alleviate horizontal smearing of data in the generated image.

The discussion provides more detail relating to decoding or reconstructing the image data and depth map information.

Decoding

In an embodiment, an algorithm for decoding or reconstructing a 3D view (or views) of an image from a side-by-side stereo pair with a single central disparity map (or a single central depth map) is provided. A central depth or disparity map is one associated with a view between the provided extreme left- and right-eye views.

Figure 3:
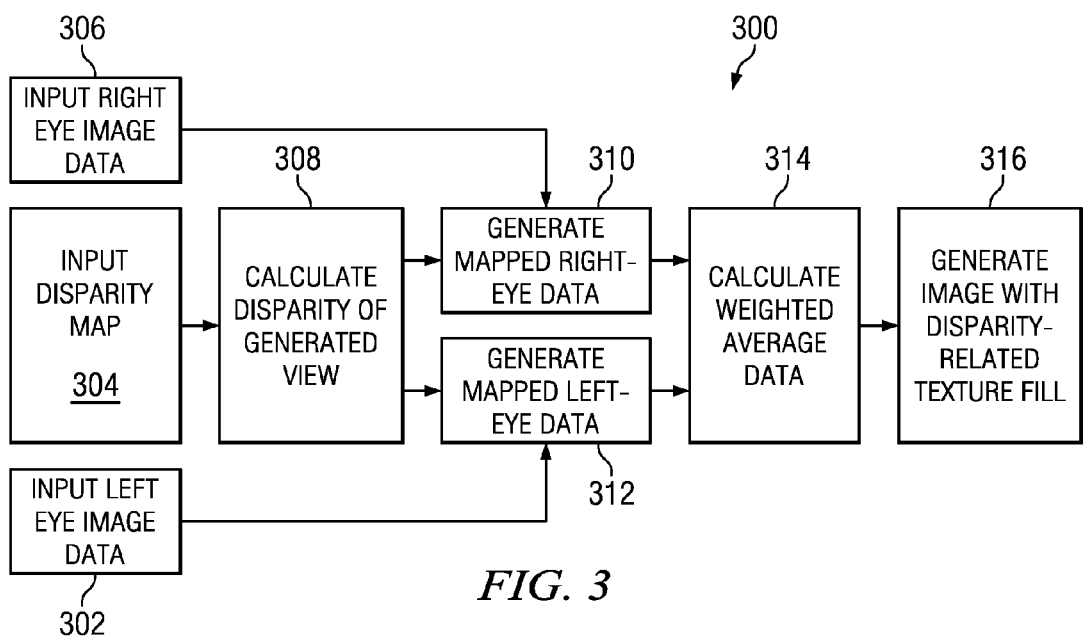
FIG. 3 is a schematic block diagram illustrating an embodiment of an embodiment of a decoding algorithm, in accordance with the present disclosure.

FIG. 3 is a block diagram 300 illustrating an embodiment of an algorithm for decoding, reconstructing, or generating a view (or views) of a 3D image. Block diagram 300 summarizes the method, while FIGS. 4-9 discuss the steps in the algorithm in greater detail.

At steps 302, 306, and 304, left eye image data, right eye image data, and a disparity map or depth map (respectively) are input into the algorithm 300. One or more views may be determined or generated based on the information input at steps 302, 306, and 304. In an embodiment, a central view is generated. In another embodiment, a view between a central view and a left-most is generated. In another embodiment, a view between a central view and a right-most view is generated. At step 308, the disparity map of the generated view is calculated. Next, using the disparity map calculated in step 308 and using the right eye image data 306 and the left eye image data 302, the mapped right-eye data is generated 310 and the mapped left-eye data is generated 312. In an embodiment, the weighted average between the data present in both the left-eye and right-eye data sets is calculated at step 314. Finally, an image is generated at step 316. In an embodiment, the image generated at step 316 includes disparity-related texture fill (discussed in more detail below).

Any of the steps (or any combination thereof) in FIG. 3 may be done sequentially or simultaneously.

Determining the Disparity Map of a Generated View

To determine the disparity map of a generated view, a case in which a central view disparity map is received at 304 is first considered.

Figure 4:
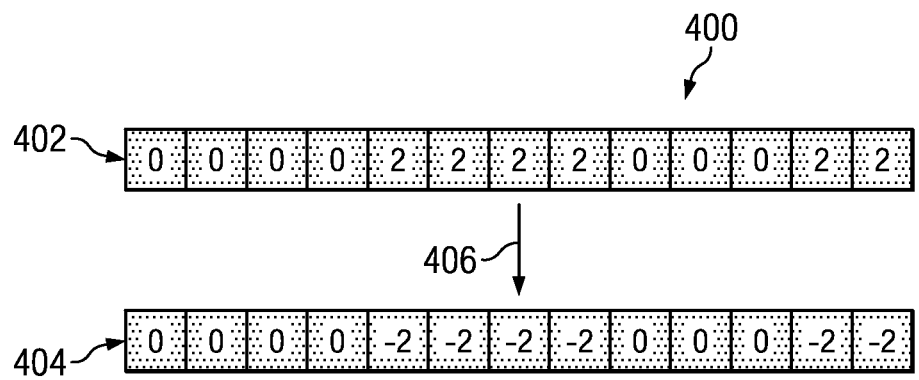
FIG. 4 is a schematic diagram illustrating disparity mapping symmetry between two right and left eye images and a central view, in accordance with the present disclosure.

FIG. 4 is a schematic diagram 400 illustrating an embodiment of a method for determining the disparity map of a generated view, for a case in which a central view disparity map 402 is received at step 304 in FIG. 3 and in which a central view is being generated at step 316 in FIG. 3. In an embodiment, the central view disparity map 402 is a disparity map representing the shift from the left-eye view to a central view. In a central view case, only the disparity map 402 representing the shift from one eye's view to a central view is transmitted because the other eye's view may be calculated due to symmetry principles. Sending the disparity map representing the shift from only one eye's view allows for greater efficiency in the transmission of data. The central view disparity map 402 comprises a series of numbers (for ease of explanation only), but could comprise any other indicator or symbol of movement from a left eye to a central view. In this central case, symmetry may be used to determine the shift from right eye 404, i.e. a simple sign reversal of the transmitted central from left-eye mapping data 402 is used to determine the central from right-eye mapping data 404. In FIG. 4, as well as in later figures, the horizontal line of boxes represent a row of data with the grey, 'half-tone' shading indicates disparity mapping.

When views other than the central view are generated, the disparity data may be modified. To modify the disparity map data, data positions are shifted in proportion to the disparity data value and adjusted (again in proportion) to its new location. In an embodiment, pixel counting is used to avoid overwriting valid data during the shifting process.

Figure 5:
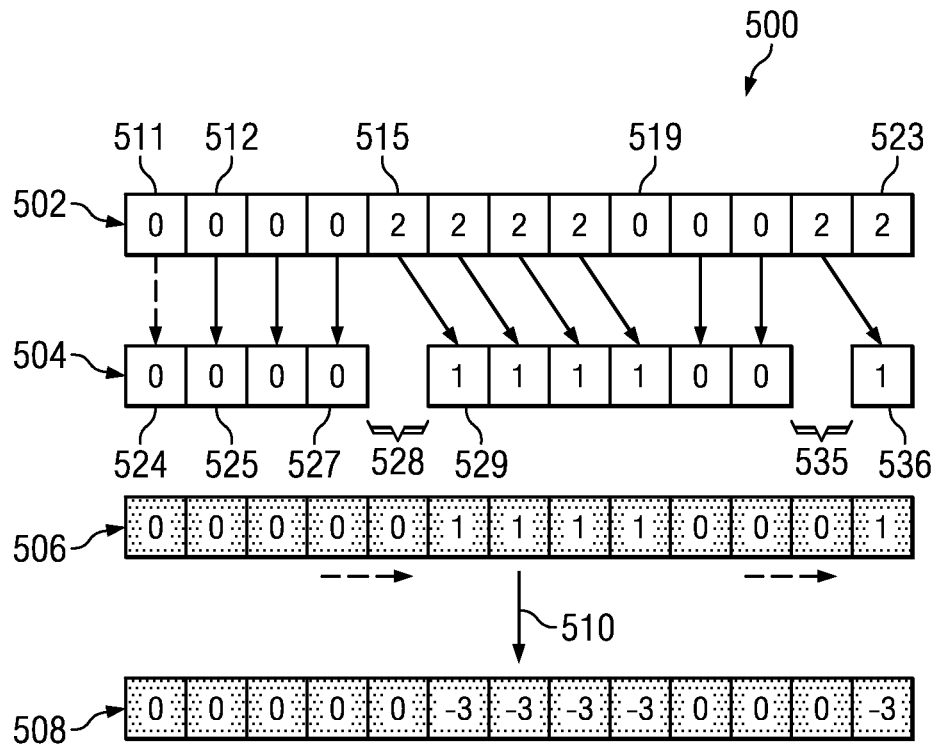
FIG. 5 is a schematic diagram illustrating view-specific disparity maps, in accordance with the present disclosure.

FIG. 5 is a schematic diagram 500 illustrating an embodiment of a method for determining the disparity map of a generated view, for a case in which a central view disparity map 502 is received at step 304 in FIG. 3 and in which a view halfway between the central view and the left most view is being generated at step 316 in FIG. 3. Pixels are updated in the direction in which they shift, and since left- and right-eye images are assumed to be captured with parallel stereographic cameras, a single shift direction is usually used. The disparity map 502 is the central from left disparity map 402 discussed in relation to FIG. 4 and includes at least disparity values at pixels 511-523. The disparity map 504 is the disparity map for a view halfway between the central view and the left view and includes at least disparity values at pixels 524-536. As discussed above, data positions are shifted in proportion to the disparity data value and adjusted in proportion to its new location. So, for this case, the disparity value at pixel 511 is zero, so it is not shifted or adjusted. Instead, the disparity value at pixel 511 is mapped directly to the disparity value at pixel 524 in the disparity map 504. The disparity value at pixel value 512 is similarly mapped to the disparity value at pixel 525. The disparity value at pixel 515, however, is two. Thus, the disparity value at pixel 515 is adjusted linearly in proportion to its new location (i.e. half way between central and left) and becomes one. It is also shifted in proportion to the original disparity value (two) and, thus, is shifted over one pixel space to the disparity value at 529. The original disparity value (two) means that the value of the central view pixel is the same as that of a pixel two horizontal pixel locations away in the left eye image (unless there is an occlusion dealt with by using pixel information only once in subsequent algorithm steps). By symmetry, it should be the same value as the pixel value found −2 pixel locations in the right eye image (again, assuming no occlusion). A derived disparity map for an intermediate view—say midway between the provided left eye view and the central view where the disparity is known—results in a new map whose pixel value is half the central disparity value at a position half of its original value away from it. In this particular case, a disparity value of 2 in the central map produces a value of 1 at the position shifted by 1 in the new derived map. In general, a disparity map at a fraction a between the center view and the left eye view would produce a map with values=(1−α)·each center disparity value at a shifted location=α·original disparity value from the original position.

Overwriting and fractional values are dealt with by updating from one side only and averaging or trumping values accordingly. In the latter simpler case, all fractions are rounded to the nearest integer.

When the disparity value at pixel 515 is shifted over to the disparity value at pixel 529, a void is left at the pixel 528. In an embodiment, voids that remain by this process are filled uniformly in the direction of update through simple data replication, as this acts to fill voids with adjacent depth texture assuming close objects reveal a more uniform background. In this case, the void at pixel 528 will be filled with the value at pixel 527, or zero. Thus, the disparity map for a view halfway between the central view and the left view is shown with voids filled in at 506. In this manner, regions revealed by looking around objects in a new viewing position are assumed to be at substantially the same depth as those directly impinging on the edge of the covering object.

In an embodiment, other algorithms may utilize similarity in image data provided by the received stereoscopic images to provide more accurate depth information. Note however that it is difficult to determine precise information to directly determine the depth of these regions. Image data in these derived depth regions is provided in one of the stereo pair as it is occluded in the second. Once determined, this disparity mapping from the provided left eye image to the current view may be used to determine the mapping from the right stereoscopic image again through symmetry. In an embodiment, mathematically, the difference in the left and right eye disparity mapping data may remain substantially constant for any depth in the scene.

Once the left eye disparity map 506 is determined, the right eye disparity map 508 (or the disparity map from the right eye view to a point half way between the center and the left eye view) can be created from symmetry principles again. In contrast to the disparity map 404 generated in FIG. 4 for the right eye view, this disparity map 508 is not determined simply by switching the signs of the values at each pixel. Because in this case, the view being generated is halfway between the center view and the left eye view, the values of the right eye disparity map for this view 508 are proportionate to that shift (three to one). Thus, the disparity values of zero in the disparity map 506 become zeros in the disparity map 508. The disparity values of one in the disparity map 506 become −3 in the disparity map 508. Once again, if the disparity map is associated with a desired view to be generated as a table of values showing where pixels come from within each of the supplied images, then the symmetry works only for the central image. For all others, the proportional shift and scale approach is used. From above, for a left eye disparity map, the value was halved (2 to 1) and shifted half the value (1) to get the mid-view between central and left. For the right disparity map, the values=(1+α)·each center disparity value at a shifted location=(1+α)·original disparity value from the original position.

Determining Image Views

Given pixel shifting or disparity map data, views may be generated by shifting pixel information from the outlying stereoscopic image pair provided.

Figure 6:
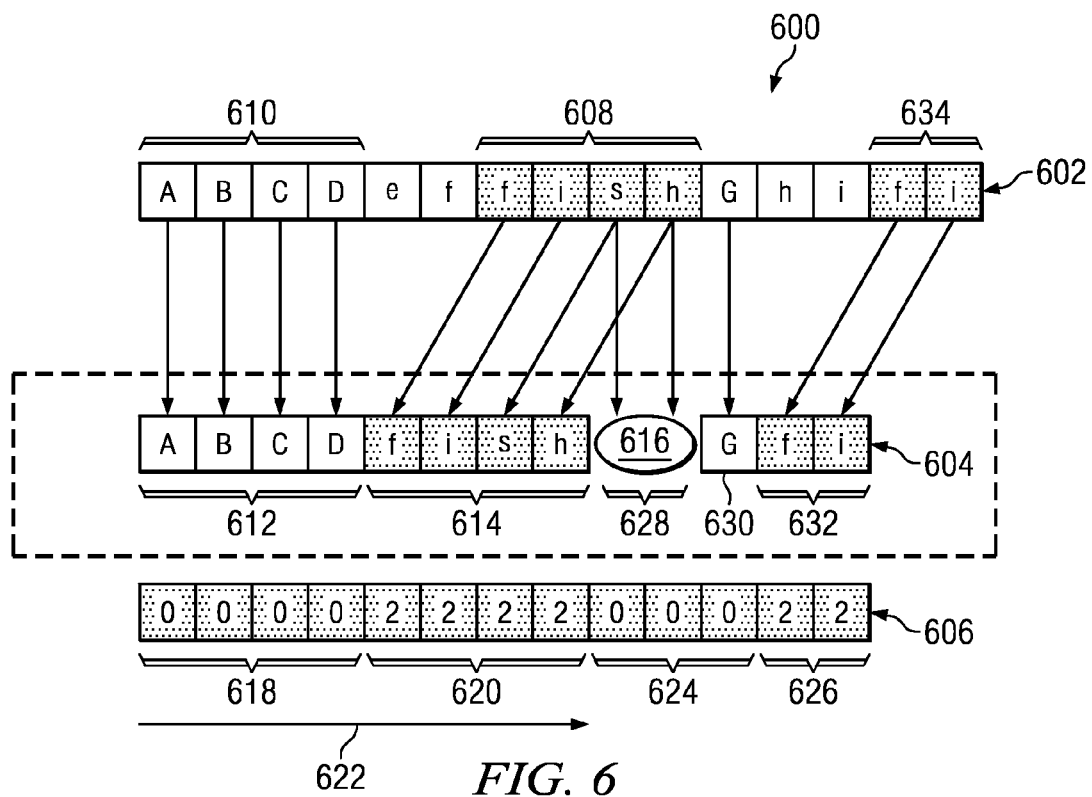
FIG. 6 is a schematic diagram illustrating generating view data from left eye image data, in accordance with the present disclosure.

FIG. 6 is a schematic diagram 600 illustrating a method for determining a pixel row 604 of a central view left eye image using the left eye disparity map 606 (the left eye disparity map 402 of FIG. 4). In an embodiment, the method for determining views is a double pass, row-by-row procedure (i.e., the method is performed twice for each row in the image). The first "pass" is illustrated by the diagram 600. The first pass determines the pixel row 604 of the left eye image of the central view. The original left eye image row 602 is one row of an image. Each row 602 has a series of pixel values (e.g., A, B, C, D, f, i, s, h, 610, 608, etc.). The pixel values shown represent RGB intensity values. The row-by-row method should be performed for each color (a total of three times) for each row 602 of the left eye image. The original left eye image 602 and the disparity map 606 are used to determine the generated left eye view pixel row 604. In an embodiment, for the left eye image, the mapping is done in a direction 622 from left to right on the disparity map 606. The first four values 618 of the disparity map 606 are zeros. For zero values 618 in the disparity map 608, the original left eye image data 610 is not shifted and is used for the same places 612 in the generated left eye image 604 (see, e.g., data values at 612). For non-zero disparity map values, pixels are shifted. For example, the non-zero values 620 in the disparity map 606 mean that pixel values 608 are shifted two places to the left 614 in the generated left eye image data 604. In an embodiment, the values from the original image row 602 are only used (or shifted) one time. So when zero values 624 of the disparity map are mapped, the s and h from 608 are not used. Instead, a void 616 results in pixel value places 628 of the generated left eye image row 604. The G value from original image data row 602 is mapped directly down to pixel value place 630 in the generated image row because of the right most zero value in disparity map data 628 of the disparity map row 606. Next, the pixel values 634 are shifted two values to the left 632 in the generated image row 604 because of the non-zero values at 626 in the disparity map row 606.

In summary, disparity values at each pixel location (e.g., 618, 620, 624, 626) give the information from where to obtain the image pixel value. An update is carried out from right to left and voids will result where image data is occluded in the provided left eye image.

Figure 7:
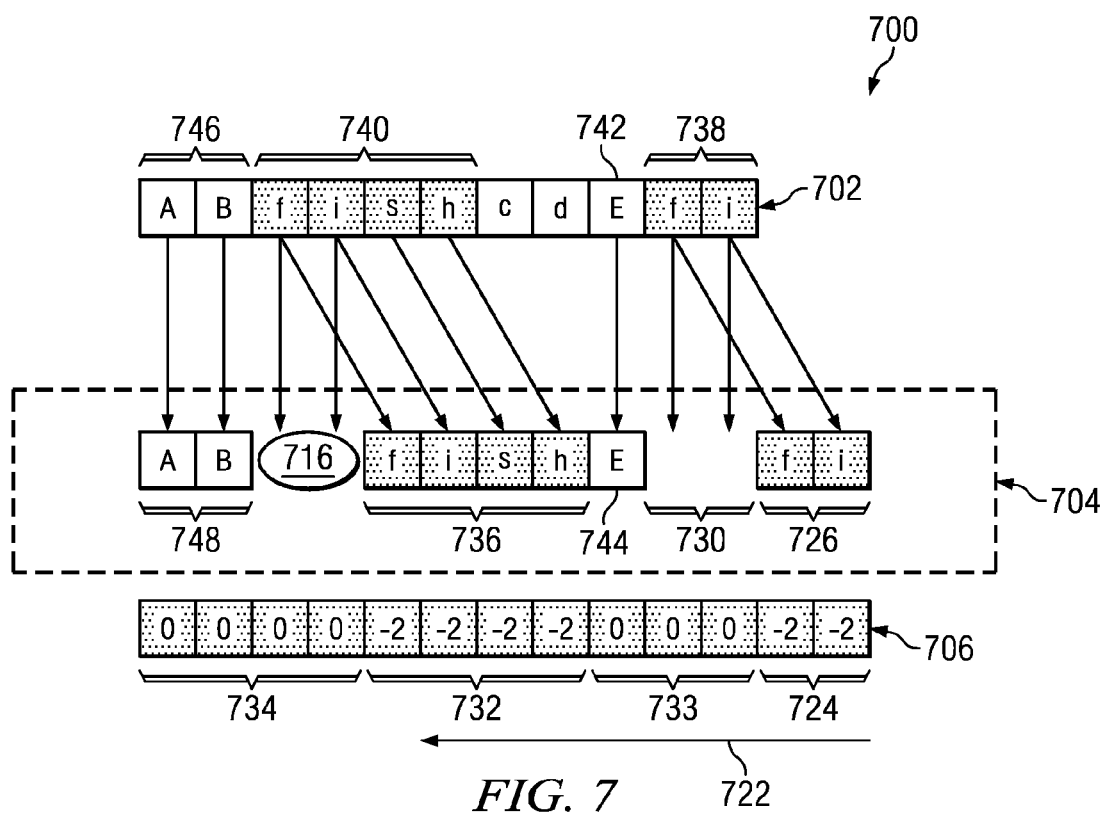
FIG. 7 is a schematic diagram illustrating generating view data from right eye image data, in accordance with the present disclosure.

FIG. 7 is a schematic diagram 700 illustrating the second "pass" of a method for determining a pixel row 704 of a central view right eye image using the right eye disparity map 706 (the right eye disparity map 404 of FIG. 4). The second pass determines the pixel row 704 of the right eye image of the central view. The original right eye image row 702 is one row of an image. Similar to the discussion above, each row 702 has a series of pixel values (e.g., A, B, f, i, s, h, etc.). The pixel values shown represent RGB intensity values. The row-by-row method should be performed for each color (a total of three times) for each row 702 of the right eye image. The original left eye image 702 and the disparity map 706 are used to determine the generated left eye view pixel row 704. In an embodiment, for the left eye image, the mapping is done in a direction 722 from right to left on the disparity map 706. The first two values 724 of the disparity map 706 are −2. Thus, the pixel values positioned at 738 (or two positions to the left of the disparity map) in the original right eye image data 702 are mapped or moved to the 726 position (or the same position as the disparity map) in the generated right eye image data 704. For zero values at 728 in the disparity map 706, the pixel value E at 742 in the original right eye image data row 702 is mapped down to position 744 in the generated image 704. This results in a void at 730 because, in an embodiment, when pixel values are used once (e.g., the f and i values at 738 were already mapped to 726), they are not used again in the mapping algorithm. Next, the pixel values 740 of the original image data 702 are shifted to the right by two places and mapped to 736 in the generated image data row because of the −2 values at 732 in the disparity map 706. Because the f and i values of 740 were used (mapped to 736), they are not used again, resulting in a void 716 in the generated right eye image data 704. The final values (A, B) at 746 in the original right eye image data 702 are mapped to 748 in the generated right eye image data 704 because of the left-most zero values at 734 in the disparity map 706.

In summary, disparity values at each pixel location (e.g., 724, 728, 732, 734) give the information from where to obtain the image pixel value. An update is carried out from left to right and voids will result where image data is occluded in the provided right eye image.

To determine the final generated image data for a view, the two sets of data are then added together.

Figure 8:
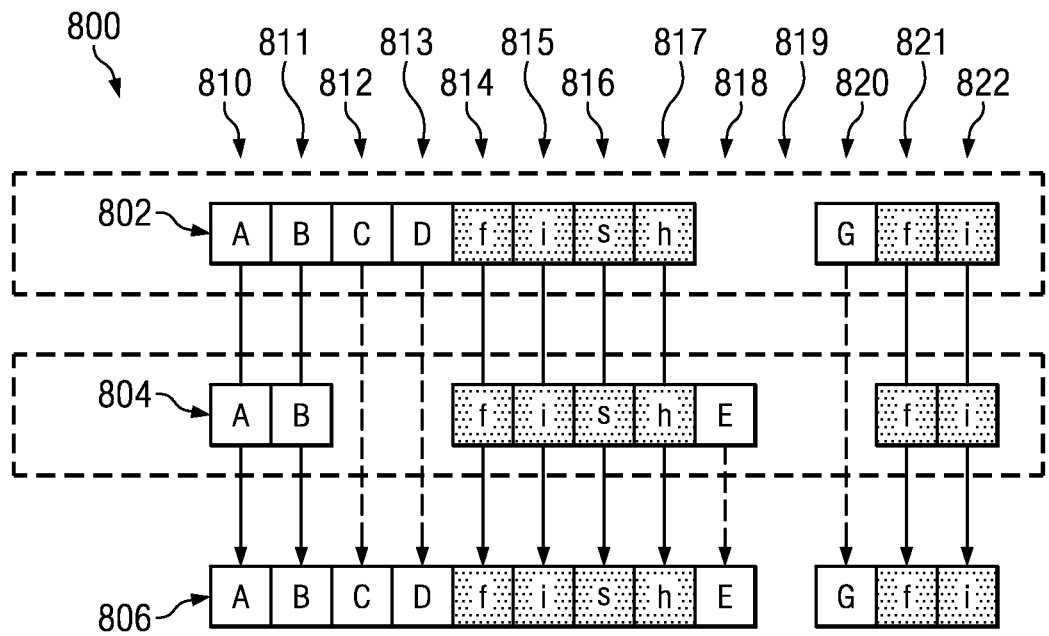
FIG. 8 is a schematic diagram illustrating creating a view image from combined left and right eye view data, in accordance with the present disclosure.

FIG. 8 is a schematic diagram 800 illustrating the generated left eye image data 802 (604 from FIG. 6) and the generated right eye image data 804 (704 from FIG. 7) being added together to result in a generated image data row 806. Rows 802, 804, and 806 include column spaces 810-823. The column spaces 810-823 are lined up for each row 802 and 804 and the rows are added using a weighted average. For example, column row 802 and 804 both contain an A value in column 810. The weighted average of the A value is A. Thus, the column 810 value in the generated image data row 806 is A. A similar addition is done for columns 811, 814-817, and 821-822. Columns 812-813 and 820 have values in row 802, but not in 804. Thus, the weighted average for this column is simply the value in row 802 and that value is used in the generated image data row 806. Similarly, column 818 has value in row 804, but not in 802 and the 804 value is used in the generated image data row 806. Finally, column 819 has no value in either row 802 or 804. Thus, generated image data row 806 has a void in column 819.

In an embodiment, data that is present in both rows 802, 804 are added in a linear weighted fashion. As the generated view approaches one or other of the provided images, pixel data is weighted more heavily toward the closer. In regions where voids are present in one but not both data, only the valid data is taken. A green screen marker value (i.e., (r,g,b)=(0, 255, 0)) or equivalent is placed in regions where both data sets have voids. These double-voided regions correspond to occluded data in both the provided left and right eyes that can nevertheless be seen from a third generated view point. In an embodiment, the voids are not filled and the image data is used with voids. In another embodiment, random RGB values are used to fill in voids. In another embodiment, a number of algorithms may be used to fill in the void. By choosing a disparity map not associated with either stereo pair, effective disparity information in double occluded regions is available.

Finally, in an embodiment, voids may be filled via in-painting using existing techniques known in the art article relating to 2D in-painting.

Implementation

FIGS. 9-14 are diagrams illustrating an implementation of an embodiment of a method for generating views using left- and right-eye image data and a disparity map.

Figure 9:
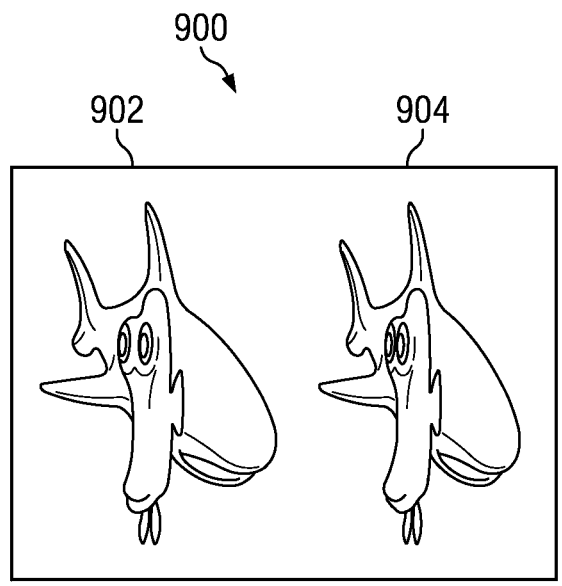
FIG. 9 is a schematic diagram illustrating exemplary input image data, in accordance with the present disclosure.

FIG. 9 is a schematic diagram 900 illustrating side by side (or left and right) stereographic images 902, 904.

Figure 10:
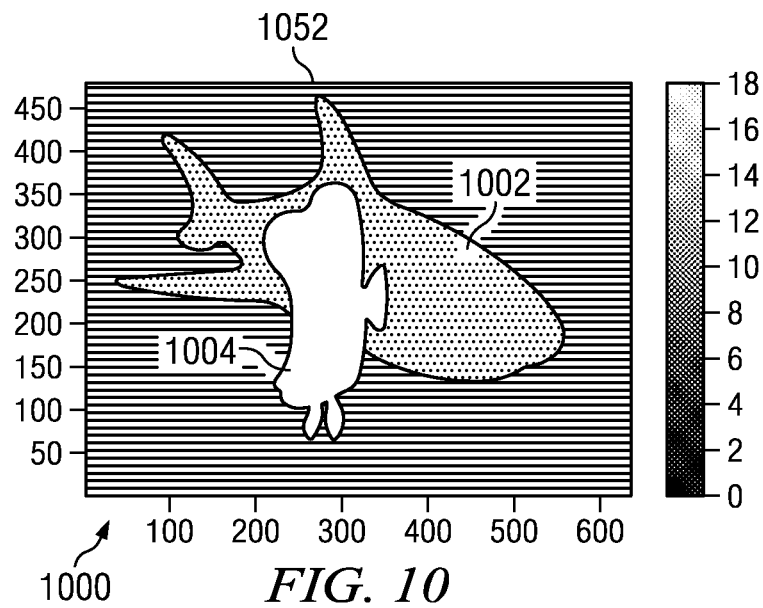
FIG. 10 is a schematic diagram illustrating an exemplary depth map, in accordance with the present disclosure.

FIG. 10 is a schematic diagram 1000 illustrating a disparity map 1052. A shark 1002 appears in the background of the image for which the disparity map 1052 is made. A fish 1004 appears in the foreground of the image for which the disparity map 1052 is made.

Figure 11:
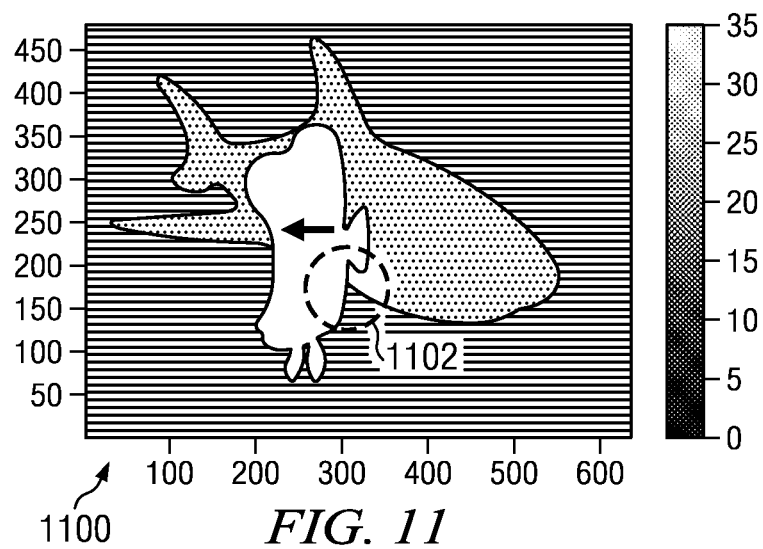
FIG. 11 is a schematic diagram illustrating shifting a disparity map to the match of a view to be generated, in accordance with the present disclosure.

FIG. 11 is a schematic diagram 1100 illustrating a horizontal filling example 1102, which is an example of filling in the depth map using the technique discussed above in relation to FIG. 5 in which the remaining voids are filled uniformly in the direction of update through simple data replication.

Figure 12:
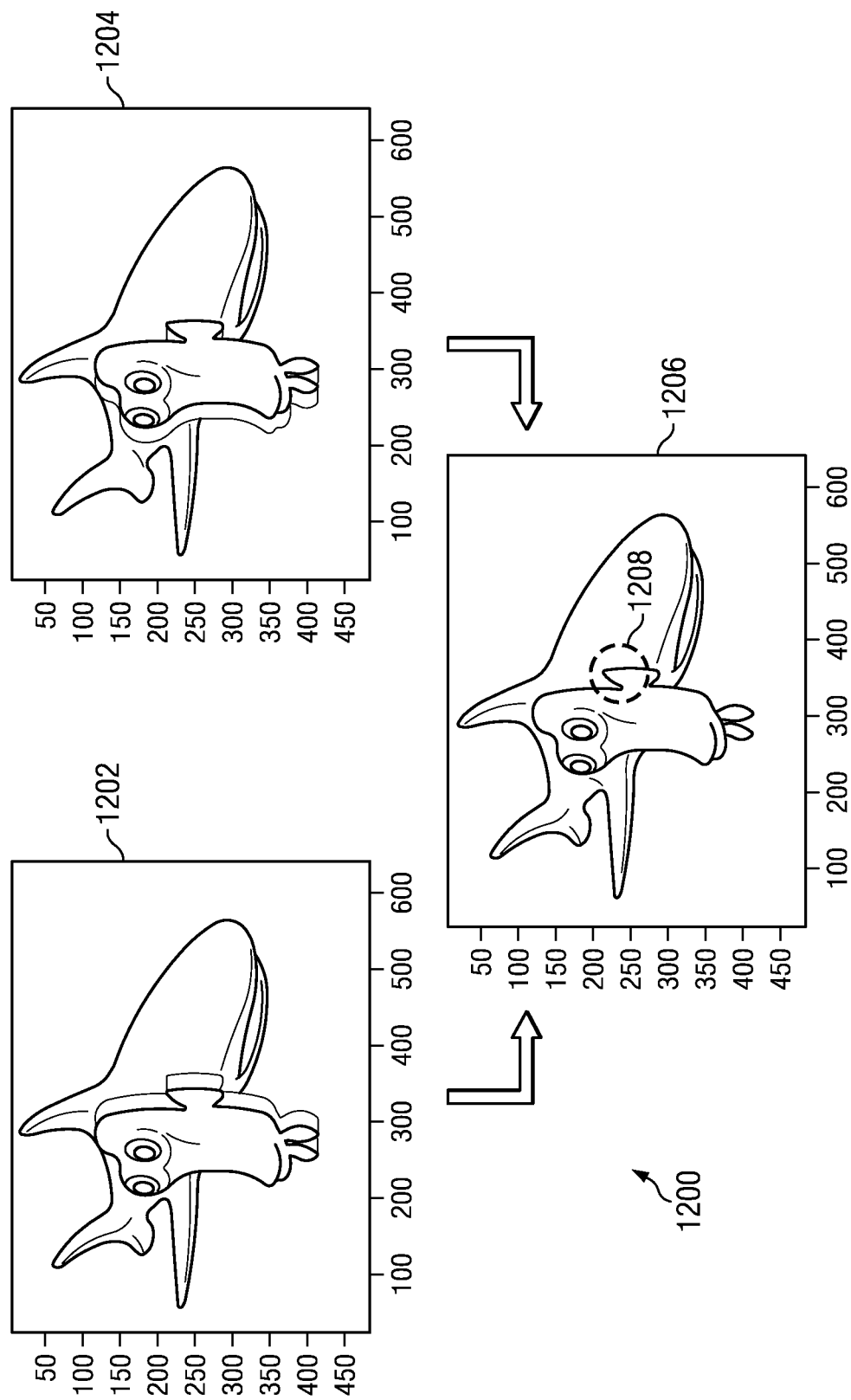
FIG. 12 is a schematic diagram illustrating creating an intermediate image from right eye and left eye image data, in accordance with the present disclosure.

FIG. 12 is a schematic diagram 1200 illustrating the generating of an image view 1208 from left eye image data 1202 and right eye image data 1204. The left eye image data 1202 is the left eye image data resulting from left eye image mapping (e.g., the process of FIG. 6). The right eye image data 1204 is the right eye image data resulting from right eye image mapping (e.g., the process of FIG. 7). The generated image view 1208 is the image resulting from adding the left- and right-eye image data 1202, 1204 (e.g., using a weighted average addition such as discussed in relation to FIG. 8).

Figure 13:
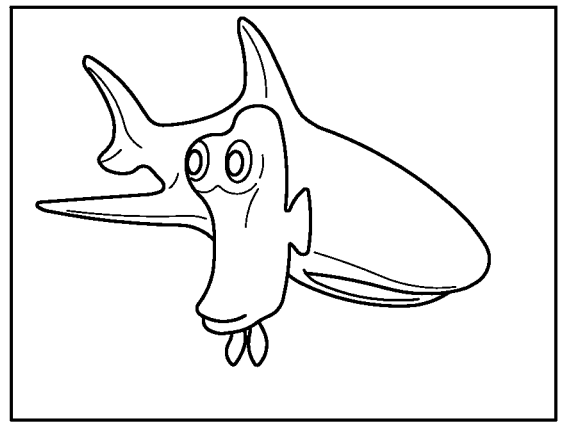
FIG. 13 is a schematic diagram illustrating the filling of voids and the removal of isolated pixel artifacts with 3×3 median filtering, in accordance with the present disclosure.

FIG. 13 is a schematic diagram 1300 illustrating an image 1300 with voids filled and isolated pixel artifacts are removed using 3×3 median filtering. With median filtering, the value of an output pixel is determined by the median of the 3×3 neighborhood pixels.

Figure 14:
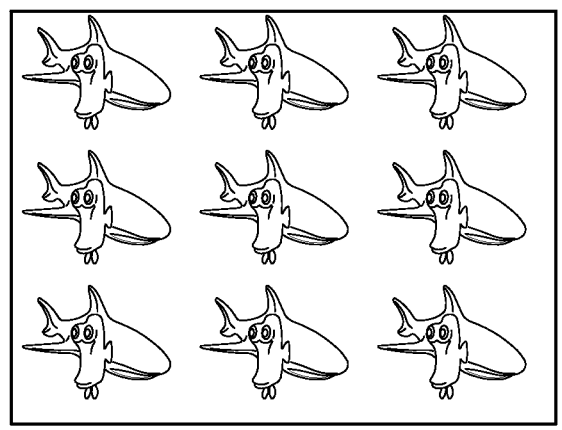
FIG. 14 is a schematic diagram illustrating a nine-tile reproduction from input data, in accordance with the present disclosure.

FIG. 14 is a schematic diagram 1400 illustrating a nine-tile reproduction from input data. This is a format for autostereoscopic displays similar to the 2-image side-by-side format. In an embodiment, a nine-tile format suitable for some autostereo displays is derived using the methods discussed in the present disclosure, including using at least two views plus a central depth map.

Generating Views Using a Non-Central View Depth Map

In an embodiment, two stereo pair views, plus a single depth-map that is not associated with a central viewpoint, but instead is associated with one of the two stereo views, is provided. For the purpose of illustration, it is assumed that the depth map is based on the left-eye view, but this approach could easily be implemented with the depth-map based on the right-eye view.

Figures 15, 16:
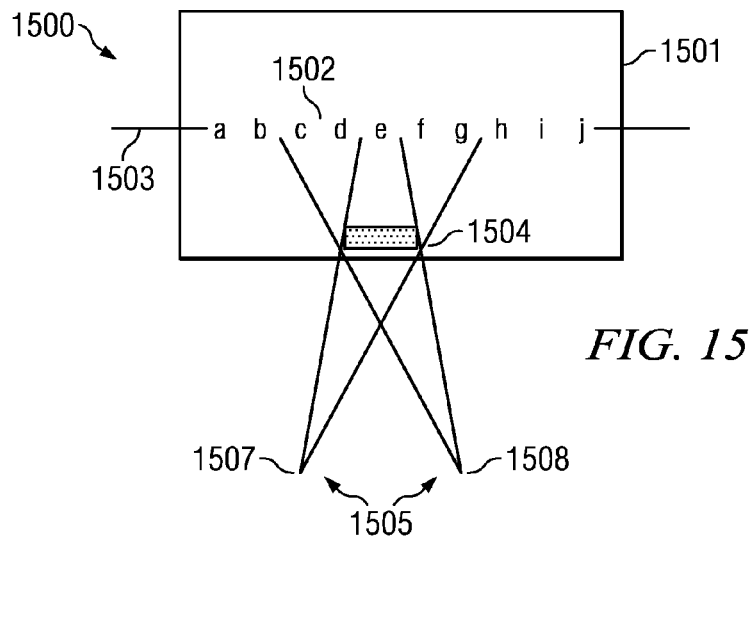
FIG. 15 is a schematic diagram illustrating left and right eye pixel contribution in a close object representation; in accordance with the present disclosure.
FIG. 16 is a schematic diagram illustrating a representation of pixel values for reconstruction of a mid-view from a single disparity map associated with the provided extreme left view, in accordance with the present disclosure.

FIG. 15 is a schematic diagram 1500 illustrating an overhead view 1501 of an artificial three-dimensional scene. The scene includes a row of ten lower-case letters 1502, 'a' through T, which are laid out width-wise in the scene (and width-wise in FIG. 15). The scene's depth dimension is represented vertically in FIG. 15; for the purpose of this example, height aspects of the scene are considered irrelevant. A cross-sectional line 1503 represents the scene's zero-parallax plane. The row of letters 1502 happens to lie in the zero-parallax plane 1503; thus, these letters 1502 will project to the substantially the same locations in both left-eye and right-eye views. Additionally, the scene includes a dark block 1504, residing in positive-parallax space, and partially blocking views of the row of letters 1502. The centers of projection 1505 for the left-eye 1507 and right-eye views 1508 are also shown in the drawing. In the left-eye view 1507, the dark block 1504 occludes the letters 'e', 'f', and 'g', while in the right-eye view 1508, the dark block 1504 occludes the letters 'c', 'd', and 'e'.

FIG. 16 is a schematic diagram 1600 illustrating example data extracted (and further calculated) from a simplified disparity map, representing a portion of one pixel row from the scene represented in FIG. 15. A zero parallax scene element appears in the plane of a stereoscopic display and has substantially no offset between the element's left- and right-eye representations in view images and has a disparity value of 0. Closer regions have negative parallax and negative disparity; far regions have positive parallax and positive disparity.

Diagram 1600 describes a simplified one dimensional left-eye row view 1601 of the scene shown in FIG. 15. The letters shown in FIG. 15 appear here in the left-eye view 1601, except that three of the letters, 'e', T, and 'g', are blocked out; this corresponds to what FIG. 15 shows, that there is a negative-parallax occlusion, which blocks the those three letters from the point of view of the left-eye center of projection 1507. Similarly, a right-eye view 1602 is shown and, here, letters 'a' through 'j' appear, but in this view the occlusion blocks letters 'c', 'd', and 'e', corresponding to what FIG. 15 shows, that there is a negative-parallax occlusion blocking those letters from the point of view of the right-eye center of projection 1508.

Item 1603 represents a disparity map that corresponds to the left-eye view 1601. The first four elements of disparity map 1603, corresponding to letters 'a' through 'd', have zero values, conveying the fact that letters 'a' through 'd' are at zero parallax, and that therefore, no offset is applied in order to map these scene elements to the right-eye view. Likewise, letters 'h' through T have disparity map values of 0, since they too are at zero parallax, with no offset used. The dark block, occluding letters 'e' through 'g', resides in negative parallax space, and the offset between its representation in the left-eye view 1601 and the right-eye view 1602 is two units in the negative direction; hence, these slots in the disparity map 1603 each get a value of −2.

When attempting to reconstruct the right-eye view 1602 using only the left-eye view 1601 and its corresponding disparity map 1603, the resulting right-eye view 1604 is mostly correct. Most of the letters have transferred over from the left-eye view to the new right-eye view, and the dark block has been offset correctly as well. However, there are two slots in this view (represented by '???') for which information is unavailable. This demonstrates an advantage of saving the original right-eye view, rather than relying on just one view and a disparity-map to calculate the second view.

To calculate an intermediate middle view 1605, the left-eye view 1601 and its corresponding disparity map 1603 may be used again. In this case however, the values in the disparity map 1603 are multiplied by ½, and the offsets are applied to the left-eye view's scene elements. The result is shown at 1605. The availability of a disparity map 1603 has allowed construction of an arbitrary view that, as we can see, is mostly correct. But, as in the right-eye reconstruction 1604 above, there is missing information due to the occlusion. Specifically, the calculated middle view 1605 is uncertain as to what scene element resides just to the left of the letter 'h'. In a typical implementation, the solution would be to extend the available information next to the missing information; thus, the 'h' pattern that is just to the right of the missing information may be replicated to fill the void. Unfortunately, that would be incorrect, as the sequence does not actually replicate the letter 'h'. In another embodiment, such as this implementation, two source views are available (the left-eye view and the right-eye view), and the right-eye view 1602 may be used to obtain information occluded in the left-eye view 1601 and needed to calculate a middle view. This middle view is also missing some information (shown with '???' in line 1607). Nonetheless, 'g' is identified as being to the left of 'h', and the '???' in the middle view 1605 can be replaced with its correct information, 'g'.

Figures 17, 18:
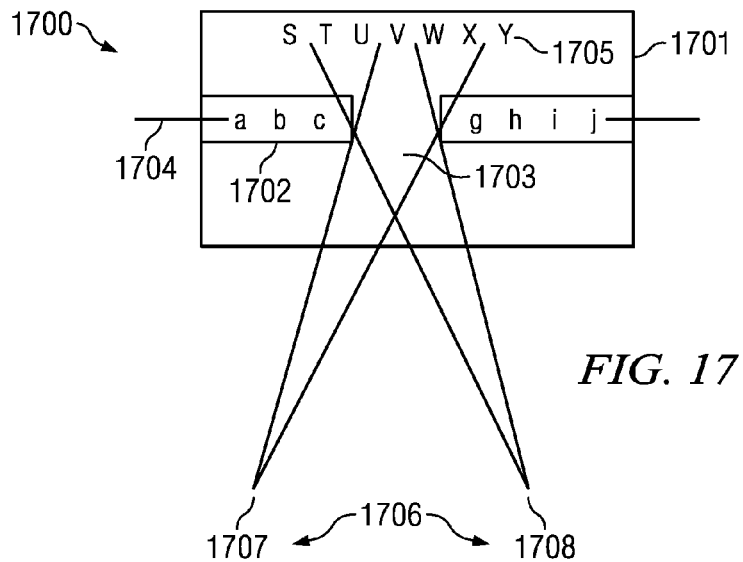
FIG. 17 is a schematic diagram illustrating positive parallax pixel elements partly obscured by a gap, in accordance with the present disclosure.
FIG. 18 is a schematic diagram illustrating pixel values and locations for reconstruction of mid views in the presence of close gaps, in accordance with the present disclosure.

FIG. 17 is a schematic diagram 1700 illustrating positive parallax pixel elements partly obscured by a gap and FIG. 18 is a schematic diagram 1800 illustrating pixel values and locations for reconstruction of mid views in the presence of close gaps. FIGS. 17 and 18 are similar implementations to FIGS. 15 and 16, except that, in this scene 1701, viewed from left-1707 and right-eye 1708 centers of projection 1706, there are positive parallax elements 1705 partly obscured by a gap 1703 in the zero parallax plane 1704 letter-sequence 1702, rather than a negative parallax element blocking the zero parallax sequence. Conceptually, these two figures demonstrate the same thing as FIGS. 15 and 16. Different back-plane information appears through the zero parallax gap, in the left-eye 1801 and right-eye 1802 projections, and some information is missing, either in a calculated right-eye view 1804 or a calculated intermediate view 1805, if the calculated views are based only on one source view and its associated disparity map 1803.

The examples of FIGS. 13 and 14 create a middle view 1605 from the left-eye view 1601 and its corresponding disparity map 1603, where missing information is filled in (with the letter 'g') by consulting the right-eye source view 1602. While the added information from the right-eye view is certainly helpful for filling the occlusion, it is not known for sure that the 'g' letter is at the same depth as the other letters, since there is no disparity map information for this element. It is known that it is occluded by the dark block that is at a depth corresponding to a disparity of −2. Therefore, it would be helpful in this instance (and even more helpful in more complex real-world examples) to have a second disparity map, one associated with the right-eye source view, in addition to the disparity map associated with the left-eye source view.

Multiple Disparity Maps

In an embodiment, a second disparity map 1606 associated with the right-eye view 1602 of FIG. 14 is constructed. This disparity map may be used to determine that the scene element represented by the letter 'g' resides at zero parallax, something that was unknown based on just the two views 1601, 1602 and a left-eye view based disparity map 1603. In an embodiment, this allows a correct calculation of the complete scene for a middle view 1608, for which there is no need to make first order guesses of the previous embodiment as to occluded content.

One issue with storing two disparity maps instead of one is that the additional disparity map may take up too much of the frame's storage or transmission space. In an embodiment, to address the transmission space issue, a reasonable approximation of the second disparity map is estimated based on a calculation from other available information, namely the two views and the first disparity map. In this embodiment, the second disparity map is not stored or transmitted, but instead, a map representing the difference between the actual second disparity map and the estimated disparity map is used. Such a map is herein termed a differential disparity map, and in an embodiment is limited enough in its information content to have the capacity to compress to a fairly small size, a fraction of the size of a compressed standard disparity map. To obtain the second disparity map upon decompression, an estimated second disparity map is calculated based on the two source views and the first disparity map, and then the decompressed differential disparity map is applied, yielding a correct second disparity map as a result.

FIG. 16 also illustrates the differential disparity map concept. A simple single-row representation of the left- 1601 and right-eye 1602 views and a disparity map 1603 associated with the left-eye view is provided. Based on those three data sources, any one of a number of algorithms may be used to estimate a right-eye view associated disparity map, though there remains some uncertainty as to the disparity (or depth) associated with the letters 'f' and 'g'. Some algorithms would reasonably (and, in an embodiment, correctly) assign a disparity of 0 to 'f' and 'g', but for the sake of this example, it is assumed that a different algorithm is used, one that assigns disparity to image elements that are occluded in the view associated with the available disparity map based on linear interpolation. Assuming that such an algorithm arrives at an estimated disparity map associated with the right-eye view, as shown in 1609, to generate a differential disparity map, elements of this map 1609 may be subtracted from the correct (or at least more correct) disparity map 1606. The result is the differential map 1610. This differential map 1610 comprises mostly zero values, and so should compress quite well. Upon decompression, this differential map can be applied to an estimated disparity map (generated by the same input data and the same algorithm) in order to recreate the desired disparity map associated with the right-eye view.

In another embodiment, an alternative to storing two disparity maps (with or without the differential technique) is contemplated. In this embodiment, one disparity map is used, in which the disparity map data may be associated with either left- or right-eye source views, on a regional basis, depending on which disparity data would be most useful for reconstructing the scene for a particular view. Such a dual-source disparity map could be accompanied by a meta-disparity map indicating for which source views different regions of the disparity map are associated. A meta-disparity map may compress to a substantially small size, relative to the disparity map itself.

In another embodiment, the differential map concept is applied to the source views themselves. If we use the two source views to construct a disparity map that is associated with (for example) the left-eye view, we can then use the left-eye view and its associated disparity map to calculate an estimated right-eye view. That estimated view can then be compared to the actual right-eye view, and the difference between the two calculated, yielding a differential right-eye view map. Upon decompression, the right-eye view may be reconstructed by using the left-eye view and its associated disparity map to calculate an estimated right-eye view, and then apply the differential right-eye view map to that, resulting in the correct right-eye view. Depending on the standards necessary, the right-eye view obtained using this technique may be just as good, or nearly so, as the source right-eye view.

In still other embodiments, the differential view map technique and the differential disparity map technique are combined in a variety of ways, such that all of the two high quality source views and two disparity maps are effectively derived from one source view, a disparity map associated with that view, a differential right-eye view map, and a differential disparity map whose result is to be associated with the reconstructed right-eye view.

In an embodiment, double-occluded information in the generated image associated with an intermediate view is generally determined with some guesswork. It is assumed that disparity information can be used to paint texture into these regions, although it might be sufficient to simply copy local texture in most cases.

Figure 19:
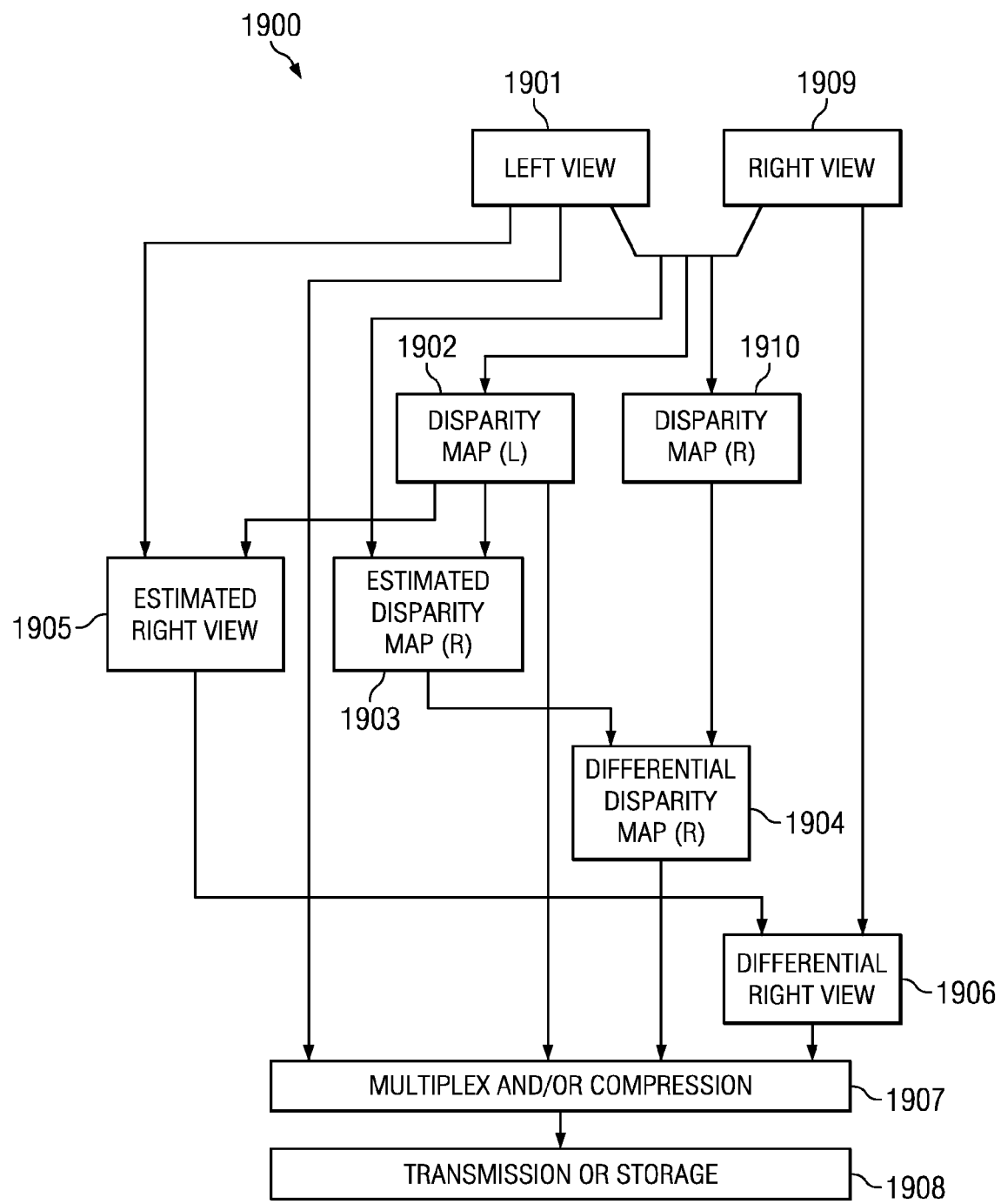
FIG. 19 is a flow diagram illustrating an embodiment for encoding two extreme left and right eye stereoscopic images, a depth/disparity map, and a differential disparity map, in accordance with the present disclosure.

FIG. 19 is a block diagram 1900 illustrating a data encoding process. Left and right views 1901, 1909 are used to generate two high quality disparity maps 1902, 1910 that are associated with each of the two respective source views. Based on the source views and one of the disparity maps (in this diagram, using the left view 1901 and the left disparity map 1902), along with an appropriate algorithm, an estimate of the other disparity map (in this diagram, the estimated right disparity map) 1903 is generated (note: the right view 1909 and the right disparity map 1910 could be used to estimate the left disparity map). That estimated map 1903 is compared to the original disparity map 1910, and the difference is stored, to the desired degree of precision, as a differential disparity map 1904. Next, using the left-eye view 1901 and its associated disparity map 1902, an estimated right-eye view 1905 is generated based on those inputs. The estimated right-eye view 1905 is compared to the actual right-eye view 1909, yielding a differential right view 1906. The following elements from above are bundled (e.g., multiplexed and/or compressed) 1907 and then stored or transmitted 1908: the original left-eye view 1901, the left-associated disparity map 1902, the right view associated differential disparity map 1904, and the differential right view 1906. The same algorithm could be done in the exact opposite manner, of course, in which case the following elements would be bundled and then stored or transmitted 1908: the original right-eye view 1909, the right-associated disparity map 1910, the left-associated differential disparity map (not shown), and the differential left view (not shown).

Figure 20:
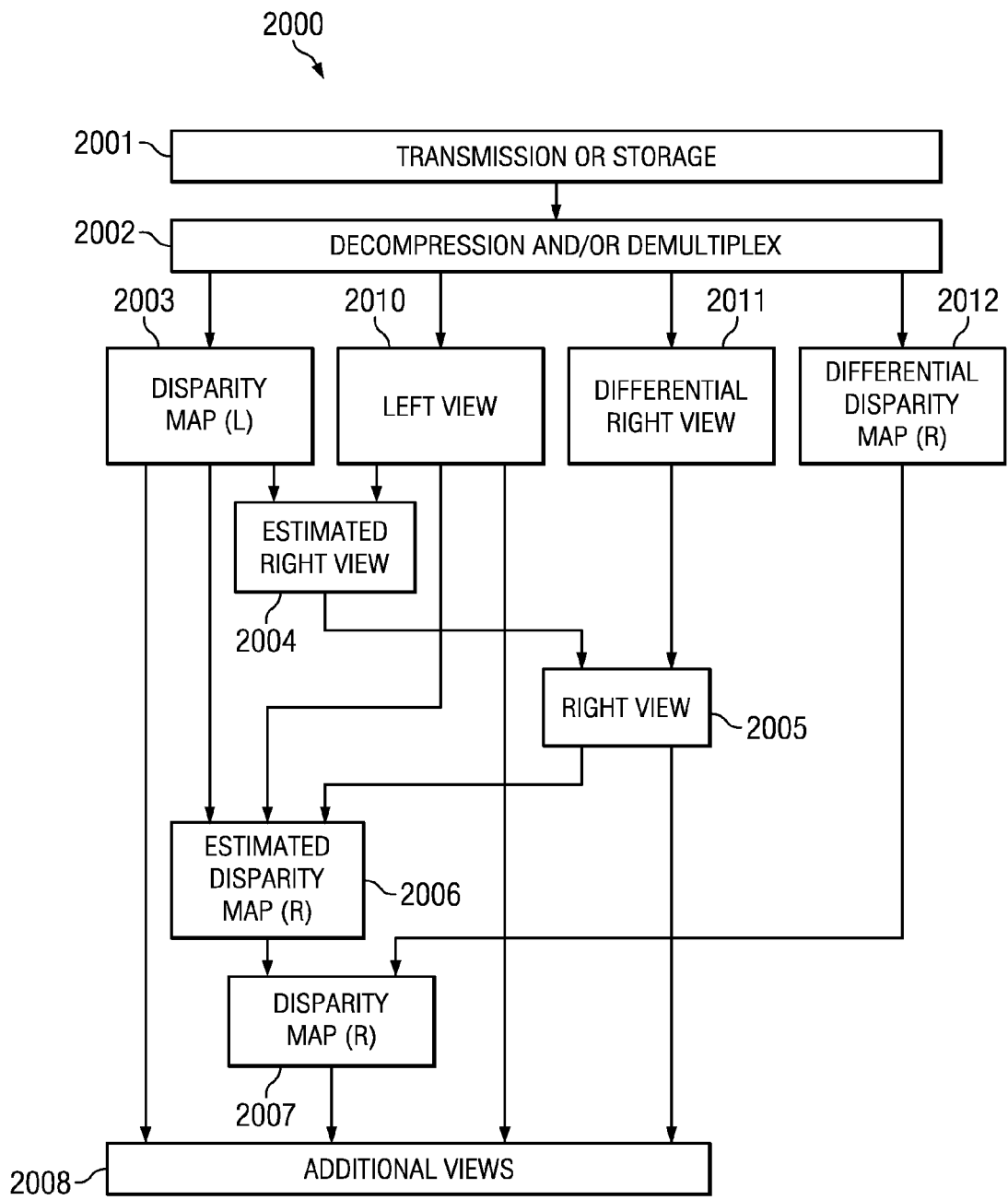
FIG. 20 is a flow diagram illustrating an embodiment for view recreation from compressed transmitted data that includes right/left eye stereoscopic images, a left eye depth/disparity, and a right eye differential depth/disparity map, in accordance with the present disclosure.

FIG. 20 is a block diagram illustrating the reverse decoding process. Data stored or transmitted arrives 2001 and is decompressed and/or demultiplexed 2002, revealing four elements: a left-eye view 2010, a left-associated disparity map 2003, a differential right view 2011, and a right view associated differential disparity map 2012. The left-eye view 2010 and its associated disparity map 2003 are used to generate an estimated right-eye view 2004, using the same algorithm that was used to calculate the estimated right-eye view 1905 in FIG. 19. That result 2004 is combined with the differential right-eye view 2011 to produce the actual right-eye view 2005. Next, the two full-quality stereo views 2010, 2005 are combined with the left-view associated disparity map 2003 to generate an estimated right-view associated disparity map 2006, using the same algorithm that was used above, as illustrated in FIG. 19, to generate that estimated disparity map 1903. The estimated disparity map generated here 2006 is combined with the right view differential disparity map 2012 to obtain a right-view associated disparity map 2007. The two high-quality views 2003, 2005 and a disparity map 2010, 2007 associated with each of those views, may be used to generate high quality intermediate or other views of the scene 2008. Again, the algorithm may be worked in a similar manner, instead starting with a right disparity map, a right eye view, a differential left view, and a left view associated differential disparity map (all not shown) after the decompression or demultiplexing stage 2002.

In an embodiment, the encoding/decoding algorithms of FIGS. 19 and 20 are performed without any need for information other than the two stereo images and a single depth map.

In all cases, the precise side-by-side encoding could involve a simple horizontal scaling of the two native stereo-images or more sophisticated pixel sampling techniques (e.g. U.S. Pat. No. 5,193,000, which is hereby fully incorporated by reference). Also, the basic information tally for the proposed algorithms could include other spatially combined arrangements such as over and under where vertical scaling or sampling is required. The algorithms just required reconstitution of a left and right eye images from a suitably encoded data stream. The depth information can also be simply added to the data in general without a specific encoding mechanism. A specific encoding could employ side-by-side image compression using MPEG2 or similar, with the compressed monochrome disparity data incorporated as a similarly compressed image 'hidden' for example in the alpha channel of the H.26x ITU video standards.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for providing image data for a three dimensional image, the method comprising:
  receiving left and right eye image data and depth information associated with the three dimensional image;
  determining, based on the left and right eye image data and depth information, three dimensional image data, wherein the three dimensional image data comprises at least one left image view and one right image view and at least one image disparity map, each of the at least one image disparity map being associated with either the left image view or the right image view; and encoding the at least one left image view and one right image view and the at least one image disparity map.

2. The method of claim 1, further comprising:
transmitting the three dimensional image data.

3. The method of claim 1, further comprising compressing the at least one left image view and one right image view and the at least one image disparity map.

4. The method of claim 1, wherein the encoding the at least one left image view and one right image view and the at least one image disparity map comprises:
using the at least one left image view and one right image view to generate two disparity maps, each of the two disparity maps associated with either the left image view or the right image view.

5. The method of claim 1, wherein the encoding the at least one left image view and one right image view and the at least one image disparity map comprises:
using the at least one left image view and one right image view and the at least one image disparity map to generate a second image disparity map.

6. The method of claim 5, further comprising:
comparing the second image disparity map to the at least one image disparity map;
recording differences between the second image disparity map and the at least one image disparity map;
storing the differences in a differential disparity map.

7. The method of claim 1, wherein the determining at least one image disparity map comprises determining two image disparity maps.

8. The method of claim 1, wherein the determining at least one image disparity map comprises determining a central view disparity map.

9. The method of claim 1, wherein the determining at least one image disparity map comprises determining a non-central view disparity map.

10. The method of claim 1, wherein the determining at least one image disparity map comprises determining two image disparity maps.

11. The method of claim 1, further comprising:
storing temporarily, in machine memory, the at least two image views and the at least one image disparity map.

12. A method for handling image data for a three dimensional image, the method comprising:
receiving three dimensional image data, wherein the three dimensional image data is determined based on left and right eye image data and depth information, and comprises at least one left image view and one right image view and at least one image disparity map, each of the at least one image disparity map being associated with either the left image view or the right image view;
decoding the three dimensional image data.

13. The method of claim 12, wherein the decoding comprises:
calculating a generated view's disparity values by:
using a first of the at least one left image view and one right image view and the generated view's disparity values and generating mapped right-eye data;
using a second of the at least one left image view and one right image view and the generated view's disparity values and generating mapped left-eye data;
calculating the weighted average of the mapped right-eye data and the mapped left-eye data; and
generating an image view.

14. The method of claim 13, further comprising filling voids in the weighted average of the mapped right-eye data and the mapped left-eye data.

15. The method of claim 12, wherein the decoding the image data comprises:
one of demultiplexing or decompressing a data stream, the data stream comprising data representative of the at least one left image view and one right image view and the at least one image disparity map;
revealing data, the data comprising:
a first of the at least one left image view and one right image view;
a first disparity map associated with the first of the at least one left image view and one right image view;
a differential disparity map associated with the second of the at least one left image view and one right image view; and
a differential view associated with the differential disparity map;
generating an estimated view, the estimated view associated with the second of the at least one left image view and one right image view;
using the estimated view and the differential view to generate the second of the at least one left image view and one right image;
using the first and second of the at least one left image view and one right image view with the first disparity map to generate an estimated second-view disparity map;
using the estimated second-view disparity map with the second of the at least one left image view and one right image view to determine a second disparity map; and
using the at least one left image view and one right image view and the at least one disparity map to generate views of a scene.

16. The method of claim 12, wherein the receiving the image data comprises receiving a left eye view and a right eye view and two image disparity maps.

17. The method of claim 12, wherein the receiving the image data comprises receiving a left eye view and a right eye view and a central view disparity map.

18. The method of claim 12, wherein the receiving the image data comprises receiving a non-central view disparity map.

19. The method of claim 12, wherein the receiving the image data comprises receiving two disparity maps.

20. The method of claim 12, further comprising:
storing temporarily, in machine memory, the image data.

21. The method of claim 12, further comprising:
displaying the three-dimensional image on a stereo display.

22. The method of claim 12, further comprising:
displaying a plurality of views of the three-dimensional image on an autostereo display.

* * * * *